US011327854B2

(12) United States Patent
Kotriwal et al.

(10) Patent No.: US 11,327,854 B2
(45) Date of Patent: May 10, 2022

(54) SYSTEM AND METHOD FOR AN ADAPTIVE ELECTION IN SEMI-DISTRIBUTED ENVIRONMENTS

(71) Applicant: Walmart Apollo, LLC, Bentonville, AR (US)

(72) Inventors: Anand Kotriwal, Bengaluru (IN); Anirban Bhattacharjee, Bengaluru (IN)

(73) Assignee: Walmart Apollo, LLC, Bentonville, AR (US)

( * ) Notice: Subject to any disclaimer, the term of this patent is extended or adjusted under 35 U.S.C. 154(b) by 421 days.

(21) Appl. No.: 16/684,080

(22) Filed: Nov. 14, 2019

(65) Prior Publication Data

US 2020/0159632 A1 May 21, 2020

Related U.S. Application Data

(60) Provisional application No. 62/821,079, filed on Mar. 20, 2019.

(30) Foreign Application Priority Data

Nov. 15, 2018 (IN) .............................. 201811043104

(51) Int. Cl.
*G06F 11/08* (2006.01)
*G06F 11/18* (2006.01)
*G06F 9/50* (2006.01)
*G06F 9/48* (2006.01)

(52) U.S. Cl.
CPC .......... *G06F 11/187* (2013.01); *G06F 9/4881* (2013.01); *G06F 9/5005* (2013.01)

(58) Field of Classification Search
CPC ..... G06F 11/187; G06F 9/4881; G06F 9/5005
See application file for complete search history.

(56) References Cited

U.S. PATENT DOCUMENTS

| 5,781,927 | A | * | 7/1998 | Wu ......................... G06F 13/18 711/158 |
| 6,993,587 | B1 | | 1/2006 | Basani et al. |
| 7,644,305 | B2 | | 1/2010 | Friedrich et al. |
| 9,298,513 | B2 | | 3/2016 | Goodman |
| 9,525,725 | B1 | | 12/2016 | Bute et al. |
| 2009/0165018 | A1 | | 6/2009 | Junqueira et al. |
| 2015/0149635 | A1 | | 5/2015 | Rajagopalan et al. |
| 2017/0024453 | A1 | * | 1/2017 | Raja ..................... G06F 16/278 |

(Continued)

*Primary Examiner* — Christine T. Tu
(74) *Attorney, Agent, or Firm* — Duane Morris LLP; Manita Rawat (57) ABSTRACT

Systems, methods, and computer-readable storage media for receiving, at a central server from a first remote data transmission device, first product data for a product at a first location and second product data for the product from a second remote data transmission device at a second location. The respective data is processed sequentially, then determined to contain identical data, such that the system selects a data transmission device as the leader. Then, at a second time, the system receives receiving additional product data from only the selected data transmission device and not from the ignored transmission device, then processes the additional product data as though it had been received from both the first remote data transmission device and the second remote data transmission device.

20 Claims, 6 Drawing Sheets

(56) References Cited

U.S. PATENT DOCUMENTS

2017/0214737 A1 7/2017 Agarwal et al.
2018/0018198 A1 1/2018 Yang et al.
2020/0057686 A1\* 2/2020 Huang ................ G06F 11/0709

\* cited by examiner

SYSTEM AND METHOD FOR AN ADAPTIVE ELECTION IN SEMI-DISTRIBUTED ENVIRONMENTS

CROSS-REFERENCE TO RELATED APPLICATIONS

This patent application claims the priority to Indian Provisional Application No. 201811043104, filed Nov. 15, 2018, and U.S. Provisional Application No. 62/821,079, filed, Mar. 20, 2019, contents of which are incorporated by reference herein.

BACKGROUND

1. Technical Field

The present disclosure relates to adaptive election of a leader from multiple similar data sources, and more specifically to eliminating duplicative transmissions of data from distinct data sources.

2. Introduction

As production, distribution, and other forms of automation increases, the amount of data being transmitted and stored is increasing exponentially. For example, in a manufacturing system, each respective point in the manufacturing process can be transmitting a current status (or other data) regarding production at that point to a server or central data aggregation location multiple times per second. As the number of points being monitored within that manufacturing process increases, the amount of data being aggregated increases by a multiple of the frequency of data transmissions. Likewise, in a distribution system, data points within the distribution chain can relay information about a product's status or location as the product moves throughout the supply chain.

TECHNICAL PROBLEM

As the number of sensors and data transmission devices increases within automated systems, exponential increases in bandwidth and storage are required, as well as an increase in the energy required for transmissions from those sensors and data transmission devices.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media a technical solution to the technical problem described. Specifically, the disclosed methods, systems, and non-transitory computer-readable storage media can reduce the bandwidth required to effectively communicate large amounts of data, reduce the data storage required for the aggregation of the data, and reduce the energy required for data transmissions.

A method for performing the concepts disclosed herein can include receiving, at a central server from a first remote data transmission device, first product data for a product at a first location and receiving, at the central server from a second remote data transmission device and within a threshold period of time, second product data for the product at a second location. The method can further include processing, at a first time via a processor of the central server, the first product data and the second product data sequentially, then determining that the first product data and the second product data are identical, to yield a determination. The method continues by selecting, via the processor of the central server and based on the determination, a selected data transmission device and an ignored transmission device from the first remote data transmission device and the second remote data transmission device. Then, at a second time, the method: receives additional product data from only the selected data transmission device and not from the ignored transmission device, and processes via the processor of the central server, the additional product data as though it had been received from both the first remote data transmission device and the second remote data transmission device.

A system configured to perform the concepts disclosed herein can include: a processor of a central server; and a computer-readable storage medium having instructions stored which, when executed by the processor, cause the processor to perform operations comprising: receiving, at the central server from a first remote data transmission device, first product data for a product at a first location; receiving, at the central server from a second remote data transmission device and within a threshold period of time, second product data for the product at a second location; processing, at a first time, the first product data and the second product data sequentially; determining that the first product data and the second product data are identical, to yield a determination; selecting, based on the determination, a selected data transmission device and an ignored transmission device from the first remote data transmission device and the second remote data transmission device; at a second time: receiving additional product data from only the selected data transmission device and not from the ignored transmission device; and processing the additional product data as though it had been received from both the first remote data transmission device and the second remote data transmission device.

A non-transitory computer-readable storage medium configured as disclosed herein can have instructions stored which, when executed by a computing device of a central server, cause the computing device to perform operations which include: receiving, at the central server from a first remote data transmission device, first product data for a product at a first location; receiving, at the central server from a second remote data transmission device and within a threshold period of time, second product data for the product at a second location; processing, at a first time, the first product data and the second product data sequentially; determining that the first product data and the second product data are identical, to yield a determination; selecting, based on the determination, a selected data transmission device and an ignored transmission device from the first remote data transmission device and the second remote data transmission device; at a second time: receiving additional product data from only the selected data transmission device and not from the ignored transmission device; and processing the additional product data as though it had been received from both the first remote data transmission device and the second remote data transmission device.

DETAILED DESCRIPTION

Various embodiments of the disclosure are described in detail below. While specific implementations are described, it should be understood that this is done for illustration purposes only. Other components and configurations may be used without parting from the spirit and scope of the disclosure. These variations shall be described herein as the various embodiments are set forth. The various steps and features outlined herein are exemplary and can be implemented in any combination thereof, including combinations that exclude, add, or modify certain steps.

Within automation systems, sensors and other devices collect information about the process or system being monitored, then transmit the information to a central server or other data aggregation point where the data can be aggregated and evaluated. Often, the various data transmission devices associated with the sensors are pinged to induce transmission of their respective, collected data to the central server. In other configurations, the data transmission devices transmit their data on a preset frequency, with known periods between transmissions.

However, often the data being transmitted by various devices is duplicated across multiple sensors or devices. That is, each sensor, despite being at distinct locations, is reporting the same data. This is problematic because of the increases in bandwidth required for these various sensor transmissions, the energy required for those transmissions cannot be recovered, and the data collected requires ever increasing storage space.

To remedy this problem, the disclosed methods, systems, and non-transitory computer-readable storage media provide for the election of a "leader" node from the various data transmission devices or applications ("nodes") which are sending identical data. The leader can be selected on a schedule with a rotation, such that no single node is consistently selected as the leader, thereby allowing load balancing across the respective nodes. Similarly, in some configurations, the system can provide for non-uniform load balancing, with scheduling/pinging of the nodes occurring separately for distinct applications, devices, or other nodes.

Consider the following example. Each node is part of a group of nodes which sends a signal with status data to a central server after every set interval. The nodes may be applications, sensors, or other devices which logically belong to a single entity or system. The respective nodes do not share any physical memory, but may in some cases communicate with one another via remote calls, or through connection with the central server (or other central end point).

Each node pings the central server after a fixed interval. In some configurations, the fixed interval can vary from node to node, whereas in other configurations the fixed interval can be identical across the various nodes. The signals from each node are collected, aggregated, and otherwise organized at the central server. At predetermined intervals, the system identifies which of the nodes are reporting identical data. The system may also identify the variance/standard deviation of the nodes from the data reported by other nodes. In other words, the system may identify how often, or at what rate, the outliers will appear within the common data identified.

Based on the identification of the identically reported data, the system can determine that, at least for a period of time, only a single node needs to report the data which was being reported by the multiple nodes. A leader is selected from among the group of nodes previously identified as transmitting identical data, and for a subsequent period of time, only that node transmits the data for the group to the central server. However, the central server treats the data from the leader node as being the data from all of the nodes in the group. For example, in some cases the central server can multiply aspects of the leader data by the number of nodes being represented in the group.

At the end of the period of time, the central server can select a new leader node and/or can request data from all of the nodes in the group to verify that the data continues to be identical across the group. In this manner, the amount of data which needs to be aggregated and recorded is reduced, the bandwidth is reduced, the energy required to transmit the data/ping the devices is reduced, and the accuracy of the data is maintained.

Where a node produces an atypical result, the data transmission device can be configured to transmit the irregularity to the central server, despite previous instructions to defer to the leader node. In other configurations, the node can, upon identifying the result as unexpected, can communicate with other nodes within the group of similar nodes to determine if the result is exclusive to the node in question, or if the group of nodes are all experiencing the same change in data to be reported.

To make the leader node selection, the central server, or a "container orchestrator," can identify a sequence in which the respective nodes will be pinged for their data. Upon being pinged, the nodes will report their data, and then the central server will make a leadership determination from the reporting nodes. In some cases, the leadership can be based on a speed of the response, whereas in other cases leadership can be based on one or more factors such as the speed, an accuracy, a consistency, a model number of the reporting device, a location of the reporting device, ownership of the device, etc. Leadership selection can be entirely driven by the state of the nodes, such that at any given time only one of the nodes can be selected to be the leader. For example, the atomic state of each node can be distributed among all of the nodes, and a leader can be selected based on those shared/known atomic states. Another factor which can be used in the selection of the leader are weights associated with specific components (such as the speed, accuracy, consistency, etc.), with the weighted sum of the respective components being used to select the leader.

During implementation, according to an embodiment, only a single data component is to be received and acted upon. However, in practice, this can be difficult due to multiple data feeds, resulting in multiple updates to the downstream systems (when they are configured to operate on a single update). To correct for this, an example solution is to coordinate the "scattering and gathering" of data. That is, the system can identify multiple operators during the scattering/processing phase, and a single operator during the gathering/communicating phase. In the case of an operator failure, the scatter/processing portion of the system is resilient and can resume from the point of abort. Subsequently, the gathering/communication phase can operate precisely given the data obtained.

Figure 1:
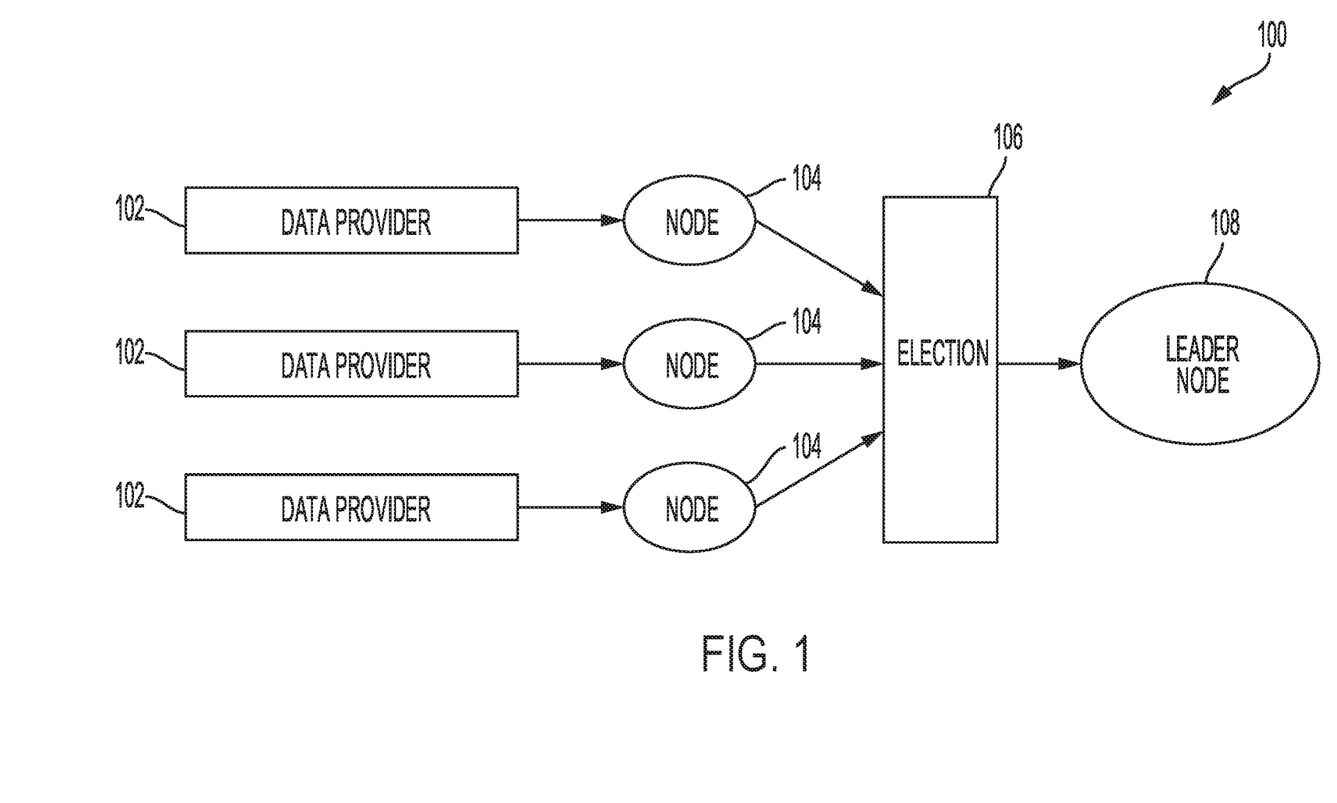
FIG. 1 illustrates an example of a node selection process.

Turning to the figures, FIG. 1 illustrates an example of a node selection process 100. In this example, various data providers 102 provide their data to nodes 104, at which point the system makes an election 106 of a leader node 108 from among the group of nodes 104. In some configurations, the data providers 102 can be sensors and the nodes 104 may represent applications associated with those respective sensors. In other configurations, the data providers 102 can represent distinct entities, or suppliers, forwarding data to a purchasing entity. In such configurations, the respective entities (the data providers 102) may forward the information using data transmission devices or applications, represented as the nodes 104.

Figure 2:
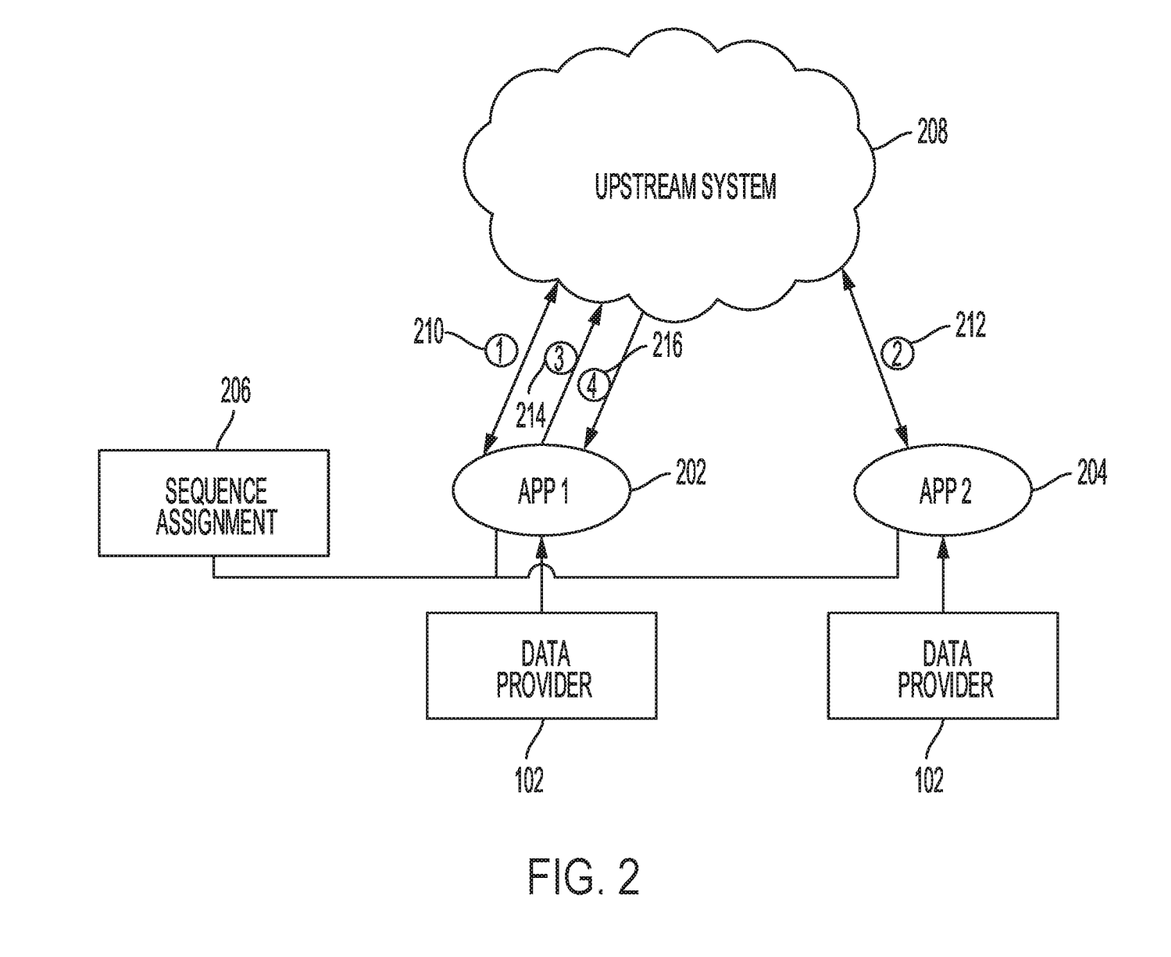
FIG. 2 illustrates an example of data transmissions from an elected node and a non-elected node.

FIG. 2 illustrates an example of data transmissions from an elected node 202 and a non-elected node 204. In this example, both nodes 202, 204, function as applications, relaying or communicating data from data providers 102 to an upstream system 208, such as a central server. The nodes 202, 204 are given a sequence assignment 206, which assigns the order and/or frequency in which the nodes will communicate with the upstream system 208. As illustrated, application 1 202 transmits initial data 210 to the upstream system 208, and can receive a response from the upstream system 208 that the data has been received. Likewise, application 2 204 can transmit initial data 212 to the upstream system 208 and receive a response from the upstream system that the data has been received.

The upstream system 208 can identify that the initial data 210, 212 received from each respective node 202, 204 is identical, and assign one of the nodes in the group as the leader node. In this case, the upstream system 208 has identified application 1 202 as the leader, such that for a period of time only application 1 202 (and not application 2 204) transmits additional data 214 to the upstream system 208 and receives acknowledgments 216 of that transmission.

Figure 3:
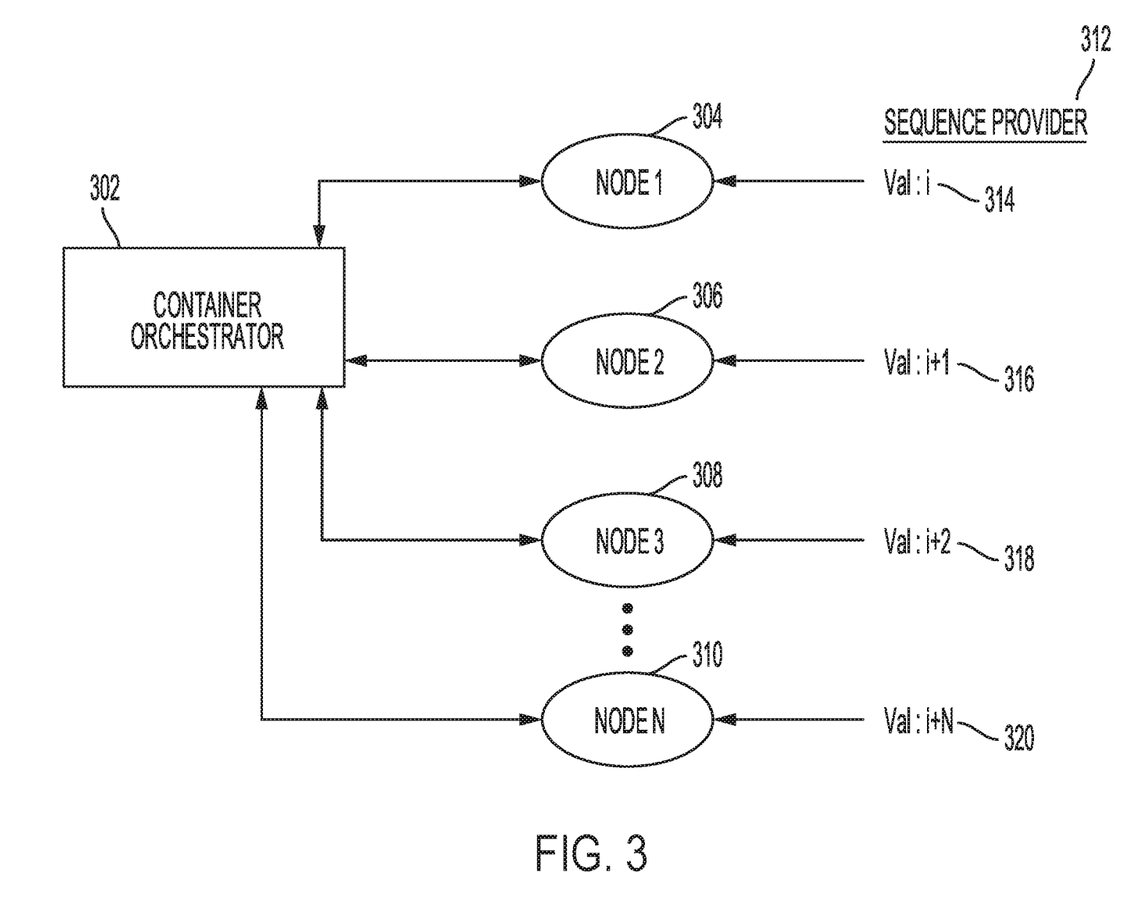
FIG. 3 illustrates a sequence of node interactions.

FIG. 3 illustrates a sequence of node interactions. In this case, the sequence provider 312 sets the order in which the nodes 304-310 will communicate with a collecting entity, illustrated in this example as a "container orchestrator" 302 which receives and aggregates the data received from the nodes 304-310. The sequence provider 312 sets a specific value 314-320 for each node, such that the nodes 304-310 are assigned a specific time in which they should communicate their data to the container orchestrator 302. In some configurations, once a leader is selected, the sequence provider 312 does not assign a time for individual nodes to transmit their respective data. In other configurations, the sequence provider 312 continues to assign transmission times to each node 304-310, however the container orchestrator 302 (or central server) has communicated with the respective nodes that they are not to transmit data for a set period of time. In such configurations, the non-elected nodes may also receive conditions in which they should communicate, despite not being selected as the leader node.

Figure 4:
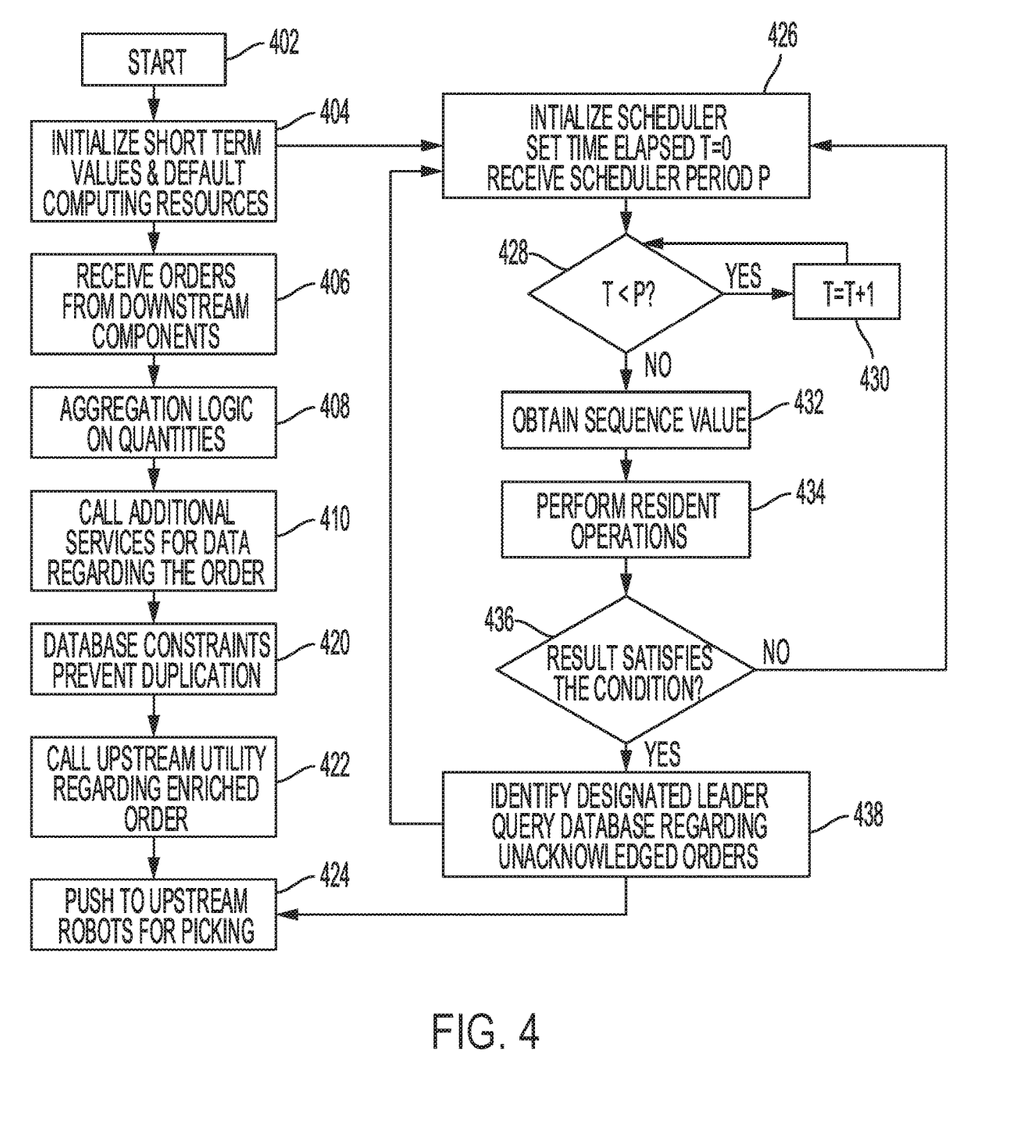
FIG. 4 illustrates a process for identifying a leader and enriching orders.

FIG. 4 illustrates a process for identifying a leader and enriching orders. In this example the system performing the process starts (402) and initializes short term values and default computing resources (404). At this point, the process forks, with both forks being performed in series or in parallel, depending on specific configuration needs. On the illustrated left fork, the system receives orders from downstream components (406), aggregates logic on quantities (408) based on the orders received, and calls for additional services for data regarding the order (410). The database where the orders are being received and stored has constraints built in such that duplication of orders is prevented (420) and an enriched order, based on the multiple identical orders received, is generated. The system calls to an upstream utility regarding the enriched order (422), and the enriched order is pushed to upstream robots for picking or otherwise processing the enriched order (424).

On the illustrated right fork, the system also initializes the scheduler, setting the time elapsed since a previous cycle to $T=0$, and receives a scheduler period P, which is the set period of time for maintaining a leader decision (426). The scheduler period P can be received from a user, from a machine learning process which evaluates the optimal time period for leadership roles, or other resources. After setting the initial values (426), the system determines if the time T is less than the period P (428). That is, has the time period for maintaining a leadership decision expired? If T is less than P, the T value is increased 430 until the time period concludes. At the end of each time period, when T is no longer less than P, the process initiates a new leadership selection by obtaining sequence values (432) and performing any residual operations (434) left over from the previous leadership. If the associated results satisfy the conditions, the system identifies a new designated leader node and queries the database regarding unacknowledged or unfulfilled orders (438). Should conditions not be met, the system can relaunch the leadership selection process, returning to the initialization step (426).

Figure 5:
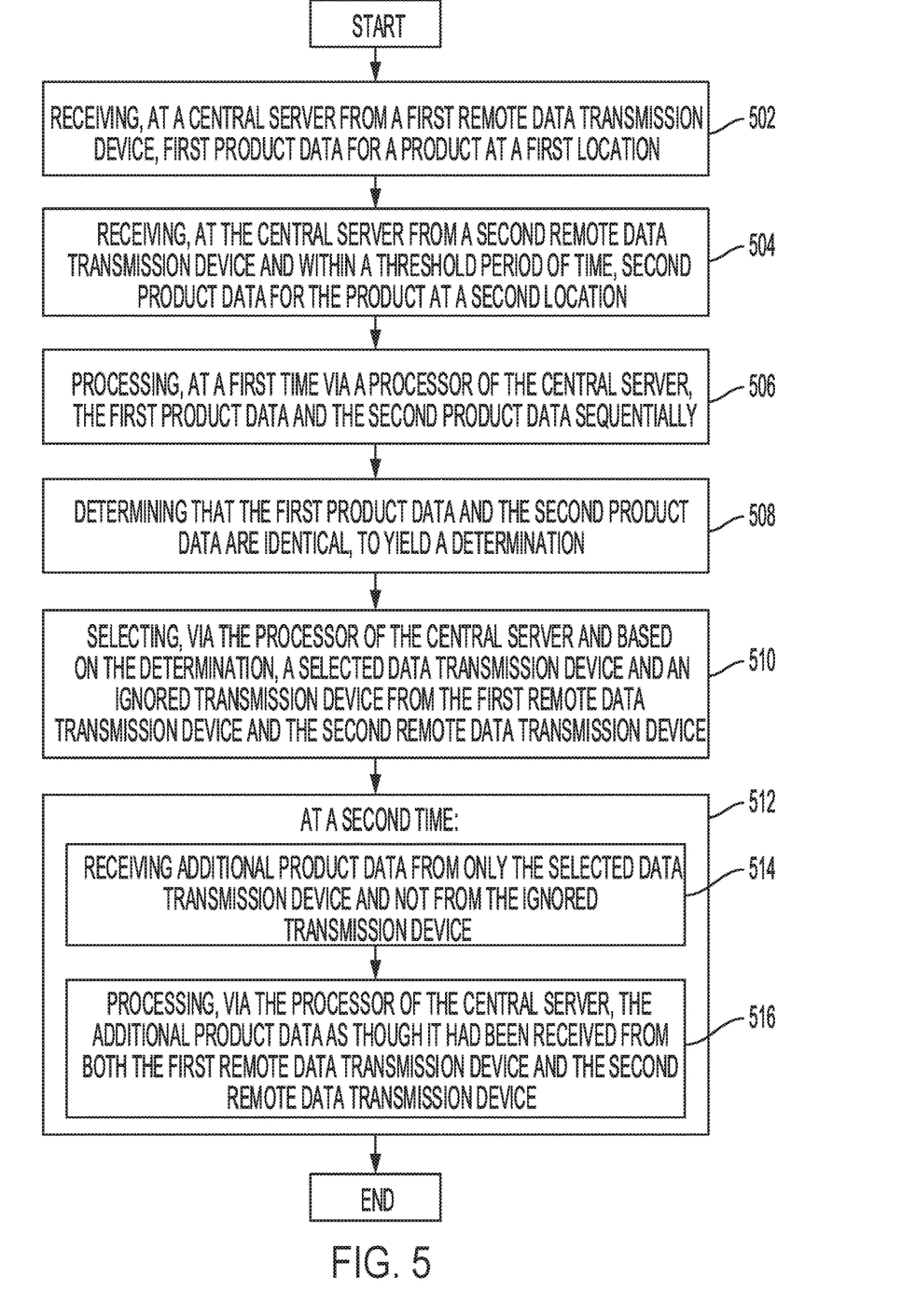
FIG. 5 illustrates an example method embodiment.

FIG. 5 illustrates an example method embodiment. In this example, a system receives, at a central server from a first remote data transmission device, first product data for a product at a first location (502), and receives, at the central server from a second remote data transmission device and within a threshold period of time, second product data for the product at a second location (504). The system processes, at a first time via a processor of the central server, the first product data and the second product data sequentially (506), and determines that the first product data and the second product data are identical, to yield a determination (508). The system selects, via the processor of the central server and based on the determination, a selected data transmission device and an ignored transmission device from the first remote data transmission device and the second remote data transmission device (510). Then, at a second time (512), the system: receives additional product data from only the selected data transmission device and not from the ignored transmission device (514) and processes, via the processor of the central server, the additional product data as though it had been received from both the first remote data transmission device and the second remote data transmission device (516).

In some configurations, the first product data, the second product data, and the additional product data respectively provide a manufacturing status of the product.

In some configurations, prior to the selecting of the selected data transmission device, the central server sequentially pings the first remote data transmission device and the second remote data transmission device at a predetermined frequency. Moreover, after the selecting of the selected data transmission device, the central server can ping the selected data transmission device at half of the predetermined frequency, thereby reducing the number of calls required to the selected "leader" data transmission device.

In some configurations, the selected data transmission device alternates between the first remote data transmission device and the second remote data transmission device on a predetermined schedule.

In some configurations, the selecting of the selected data transmission device further comprises selecting the selected data transmission device from a plurality of devices including the first remote data transmission device and the second remote data transmission device, wherein only a single device in the plurality of devices is selected as the selected data transmission device and all other devices in the plurality of devices are identified as ignored devices.

In some configurations, the selecting of the selected data transmission device is further based on energy required to transmit data to the central server.

Figure 6:
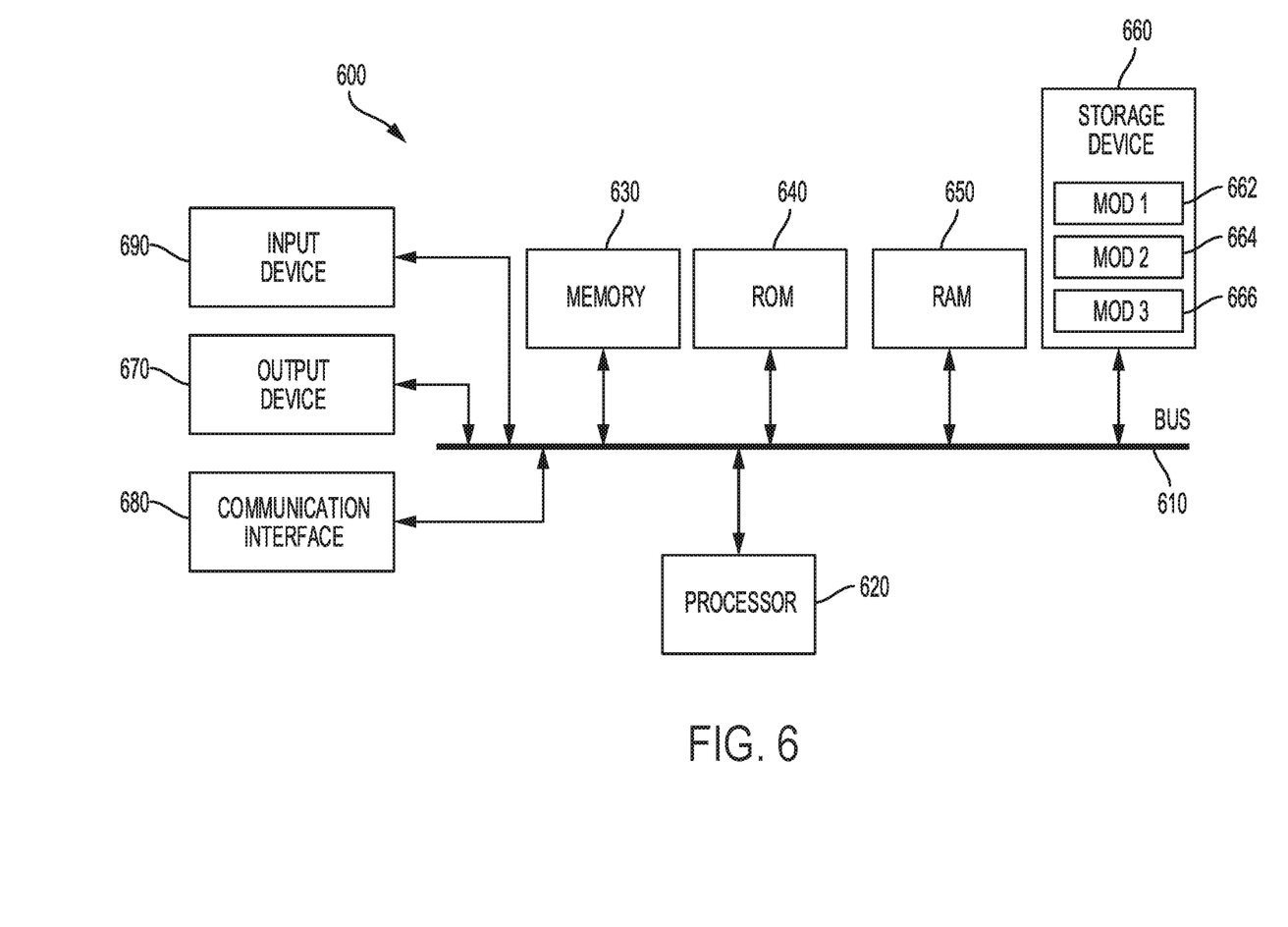
FIG. 6 illustrates an example computer system.

With reference to FIG. 6, an exemplary system includes a general-purpose computing device 600, including a processing unit (CPU or processor) 620 and a system bus 610 that couples various system components including the system memory 630 such as read-only memory (ROM) 640 and random access memory (RAM) 650 to the processor 620. The system 600 can include a cache of high-speed memory connected directly with, in close proximity to, or integrated as part of the processor 620. The system 600 copies data from the memory 630 and/or the storage device 660 to the cache for quick access by the processor 620. In this way, the cache provides a performance boost that avoids processor 620 delays while waiting for data. These and other modules can control or be configured to control the processor 620 to perform various actions. Other system memory 630 may be available for use as well. The memory 630 can include multiple different types of memory with different performance characteristics. It can be appreciated that the disclosure may operate on a computing device 600 with more than one processor 620 or on a group or cluster of computing devices networked together to provide greater processing capability. The processor 620 can include any general purpose processor and a hardware module or software module, such as module 1 662, module 2 664, and module 3 666 stored in storage device 660, configured to control the processor 620 as well as a special-purpose processor where software instructions are incorporated into the actual processor design. The processor 620 may essentially be a completely self-contained computing system, containing multiple cores or processors, a bus, memory controller, cache, etc. A multi-core processor may be symmetric or asymmetric.

The system bus 610 may be any of several types of bus structures including a memory bus or memory controller, a peripheral bus, and a local bus using any of a variety of bus architectures. A basic input/output (BIOS) stored in ROM 640 or the like, may provide the basic routine that helps to transfer information between elements within the computing device 600, such as during start-up. The computing device 600 further includes storage devices 660 such as a hard disk drive, a magnetic disk drive, an optical disk drive, tape drive or the like. The storage device 660 can include software modules 662, 664, 666 for controlling the processor 620. Other hardware or software modules are contemplated. The storage device 660 is connected to the system bus 610 by a drive interface. The drives and the associated computer-readable storage media provide nonvolatile storage of computer-readable instructions, data structures, program modules and other data for the computing device 600. In one aspect, a hardware module that performs a particular function includes the software component stored in a tangible computer-readable storage medium in connection with the necessary hardware components, such as the processor 620, bus 610, display 670, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 600 is a small, handheld computing device, a desktop computer, or a computer server.

Although the exemplary embodiment described herein employs the hard disk 660, other types of computer-readable media which can store data that are accessible by a computer, such as magnetic cassettes, flash memory cards, digital versatile disks, cartridges, random access memories (RAMs) 650, and read-only memory (ROM) 640, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 600, an input device 690 represents any number of input mechanisms, such as a microphone for speech, a touch-sensitive screen for gesture or graphical input, keyboard, mouse, motion input, speech and so forth. An output device 670 can also be one or more of a number of output mechanisms known to those of skill in the art. In some instances, multimodal systems enable a user to provide multiple types of input to communicate with the computing device 600. The communications interface 680 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z" or "at least one or more of X, Y, or Z" are intended to convey a single item (just X, or just Y, or just Z) or multiple items (i.e., {X and Y}, {Y and Z}, or {X, Y, and Z}). "At least one of" is not intended to convey a requirement that each possible item must be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
receiving, at a central server from a first remote data transmission device, first product data for a product at a first location;
receiving, at the central server from a second remote data transmission device and within a threshold period of time, second product data for the product at a second location;
processing, at a first time via a processor of the central server, the first product data and the second product data sequentially;
determining that the first product data and the second product data are identical, to yield a determination;
selecting, via the processor of the central server and based on the determination, a selected data transmission device and an ignored transmission device from the first remote data transmission device and the second remote data transmission device;
at a second time:

receiving additional product data from only the selected data transmission device and not from the ignored transmission device; and processing, via the processor of the central server, the additional product data which had been received from both the first remote data transmission device and the second remote data transmission device.

2. The method of claim 1, wherein the first product data, the second product data, and the additional product data respectively provide a manufacturing status of the product.

3. The method of claim 1, wherein prior to the selecting of the selected data transmission device, the central server sequentially pings the first remote data transmission device and the second remote data transmission device at a predetermined frequency.

4. The method of claim 3, wherein after the selecting of the selected data transmission device, the central server pings the selected data transmission device at half of the predetermined frequency.

5. The method of claim 1, wherein the selected data transmission device alternates between the first remote data transmission device and the second remote data transmission device on a predetermined schedule.

6. The method of claim 1, wherein the selecting of the selected data transmission device further comprises selecting the selected data transmission device from a plurality of devices including the first remote data transmission device and the second remote data transmission device, wherein only a single device in the plurality of devices is selected as the selected data transmission device and all other devices in the plurality of devices are identified as ignored devices.

7. The method of claim 1, wherein the selecting of the selected data transmission device is further based on energy required to transmit data to the central server.

8. A system comprising:
a processor of a central server; and
a computer-readable storage medium having instructions stored which, when executed by the processor, cause the processor to perform operations comprising:
receiving, at the central server from a first remote data transmission device, first product data for a product at a first location;
receiving, at the central server from a second remote data transmission device and within a threshold period of time, second product data for the product at a second location;
processing, at a first time, the first product data and the second product data sequentially;
determining that the first product data and the second product data are identical, to yield a determination;
selecting, based on the determination, a selected data transmission device and an ignored transmission device from the first remote data transmission device and the second remote data transmission device;
at a second time:
receiving additional product data from only the selected data transmission device and not from the ignored transmission device; and
processing the additional product data which had been received from both the first remote data transmission device and the second remote data transmission device.

9. The system of claim 8, wherein the first product data, the second product data, and the additional product data respectively provide a manufacturing status of the product.

10. The system of claim 8, wherein prior to the selecting of the selected data transmission device, the central server sequentially pings the first remote data transmission device and the second remote data transmission device at a predetermined frequency.

11. The system of claim 10, wherein after the selecting of the selected data transmission device, the central server pings the selected data transmission device at half of the predetermined frequency.

12. The system of claim 8, wherein the selected data transmission device alternates between the first remote data transmission device and the second remote data transmission device on a predetermined schedule.

13. The system of claim 8, wherein the selecting of the selected data transmission device further comprises selecting the selected data transmission device from a plurality of devices including the first remote data transmission device and the second remote data transmission device, wherein only a single device in the plurality of devices is selected as the selected data transmission device and all other devices in the plurality of devices are identified as ignored devices.

14. The system of claim 8, wherein the selecting of the selected data transmission device is further based on energy required to transmit data to the central server.

15. A non-transitory computer-readable storage medium having instructions stored which, when executed by a computing device of a central server, cause the computing device to perform operations comprising:
receiving, at the central server from a first remote data transmission device, first product data for a product at a first location;
receiving, at the central server from a second remote data transmission device and within a threshold period of time, second product data for the product at a second location;
processing, at a first time, the first product data and the second product data sequentially;
determining that the first product data and the second product data are identical, to yield a determination;
selecting, based on the determination, a selected data transmission device and an ignored transmission device from the first remote data transmission device and the second remote data transmission device;
at a second time:
receiving additional product data from only the selected data transmission device and not from the ignored transmission device; and
processing the additional product data which had been received from both the first remote data transmission device and the second remote data transmission device.

16. The non-transitory computer-readable storage medium of claim 15, wherein the first product data, the second product data, and the additional product data respectively provide a manufacturing status of the product.

17. The non-transitory computer-readable storage medium of claim 15, wherein prior to the selecting of the selected data transmission device, the central server sequentially pings the first remote data transmission device and the second remote data transmission device at a predetermined frequency.

18. The non-transitory computer-readable storage medium of claim 17, wherein after the selecting of the selected data transmission device, the central server pings the selected data transmission device at half of the predetermined frequency.

19. The non-transitory computer-readable storage medium of claim 15, wherein the selected data transmission device alternates between the first remote data transmission device and the second remote data transmission device on a predetermined schedule.

20. The non-transitory computer-readable storage medium of claim 15, wherein the selecting of the selected data transmission device further comprises selecting the selected data transmission device from a plurality of devices including the first remote data transmission device and the second remote data transmission device, wherein only a single device in the plurality of devices is selected as the selected data transmission device and all other devices in the plurality of devices are identified as ignored devices.

* * * * *